United States Patent [19]

Wu et al.

[11] Patent Number: 4,697,660

[45] Date of Patent: Oct. 6, 1987

[54] VEHICLE WITH MULTIPLE POWER SOURCE

[76] Inventors: C. H. Wu; Gerald P. T. Wu, both of Hsiang San Hsiang No. 30, Hsiang San Keng, Hsinchu, Taiwan

[21] Appl. No.: 793,662

[22] Filed: Oct. 31, 1985

[51] Int. Cl.$^4$ ................................................ B60K 5/04
[52] U.S. Cl. ...................................... 180/65.2; 180/297
[58] Field of Search ...................... 180/65.2, 69.6, 297

[56] References Cited

U.S. PATENT DOCUMENTS

| | | | |
|---|---|---|---|
| 3,503,464 | 3/1970 | Yardneg | 180/65.2 |
| 3,858,674 | 1/1975 | Tabor | 180/65.2 |
| 3,923,115 | 12/1975 | Helling | 180/65.2 |
| 4,300,649 | 11/1981 | Sakata | 180/297 |
| 4,470,476 | 9/1984 | Hunt | 180/65.2 |
| 4,533,011 | 8/1985 | Heidemeyer et al. | 180/65.2 |

*Primary Examiner*—John J. Love
*Assistant Examiner*—Richard Camby
*Attorney, Agent, or Firm*—Ladas & Parry

[57] ABSTRACT

A multipowered source vehicle having two or more power sources which can be operated concurrently or asynchronously and which include an electric motor and an engine. The electric motor and engine are each connected to one output shaft and arranged in parallel with each other and transverse of the longitudinal axes of the vehicle. In concurrent operation, the electric motor and engine operate to enhance the total power of the vehicle.

10 Claims, 5 Drawing Figures

VEHICLE WITH MULTIPLE POWER SOURCE

BACKGROUND OF THE INVENTION

The present invention relates to a vehicle with multiple power source, and more particularly to a vehicle having an engine and an electric motor.

In view of the fact that the recent battery manufacturing technique can not provide a sufficient long life battery, conventional electro mobile can only supply with 2-3 hours of power source in its practical use. It is inconvenient that the electro mobile will stop in midway very often due to lack of power. Therefore, an additional break-down truck is required for drawing said electro mobile to the repair shop for charging. Furthermore, the use of the battery is impractical because it takes a long time to charge a battery. Although a spare battery can be used, it is also impractical due to the fact that the volume of the spare battery is too large and it occupied a substantial large space, with very high cost.

Briefly, the present invention overcomes the disadvantages of prior electro mobile by providing a vehicle with multiple power source comprising an engine, an electric motor, a torque converter, a gear transmission, a solenoid operated clutch, a circuit controller, a starting motor, a mechanical brake, a battery, and a charger etc. The torque converter is disposed between the output shaft of the engine and the output shaft of the electric motor. The solenoid operated clutch is disposed on the output shaft of the electric motor adjacent to the torque converter for shifting power transmission between the output shaft of the engine and the output shaft of the electric motor.

The transmission is disposed on the output shaft of the electric motor adjacent to the solenoid operated clutch, and has an output shaft served as a wheel axle.

Accordingly, it is an object of the present invention to provide a vehicle with multiple power source that can be driven by either an engine or electric motor in order that when the power source of the electric motor is exhausted, the engine can be used to avoid midway stop of the vehicle. Both engine and electric motor can be used simultaneously in order to increase the driving force of the vehicle.

Other objects and advantages of this invention will be readily apparent from the following descriptions wherein reference is made to the accompanying drawings.

DESCRIPTION OF THE PREFERRED EMBODIMENT

Figure 1:
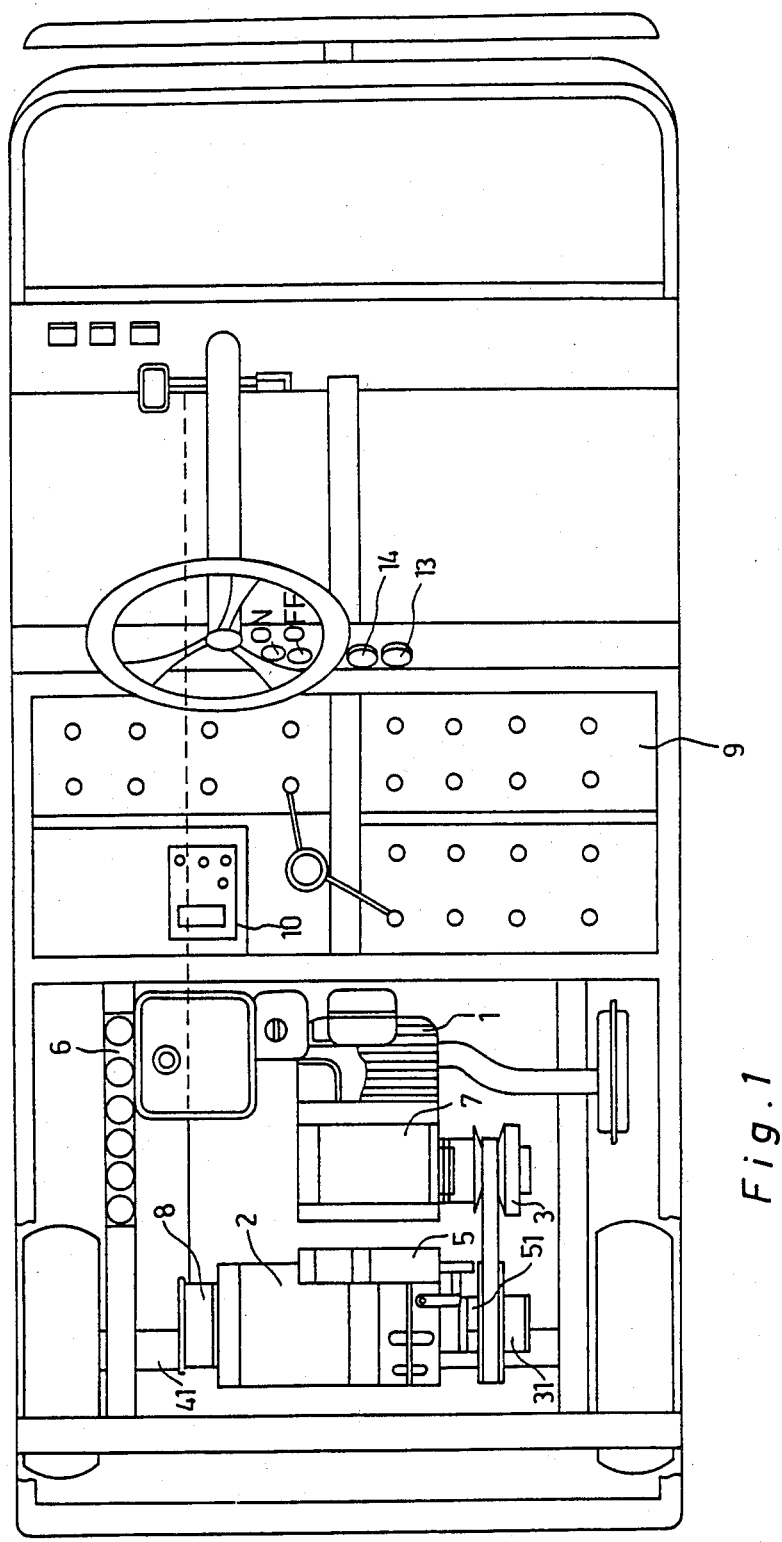
FIG. 1 is a top view of an embodiment of a vehicle with multiple power source in accordance with the present invention.
Figure 2:
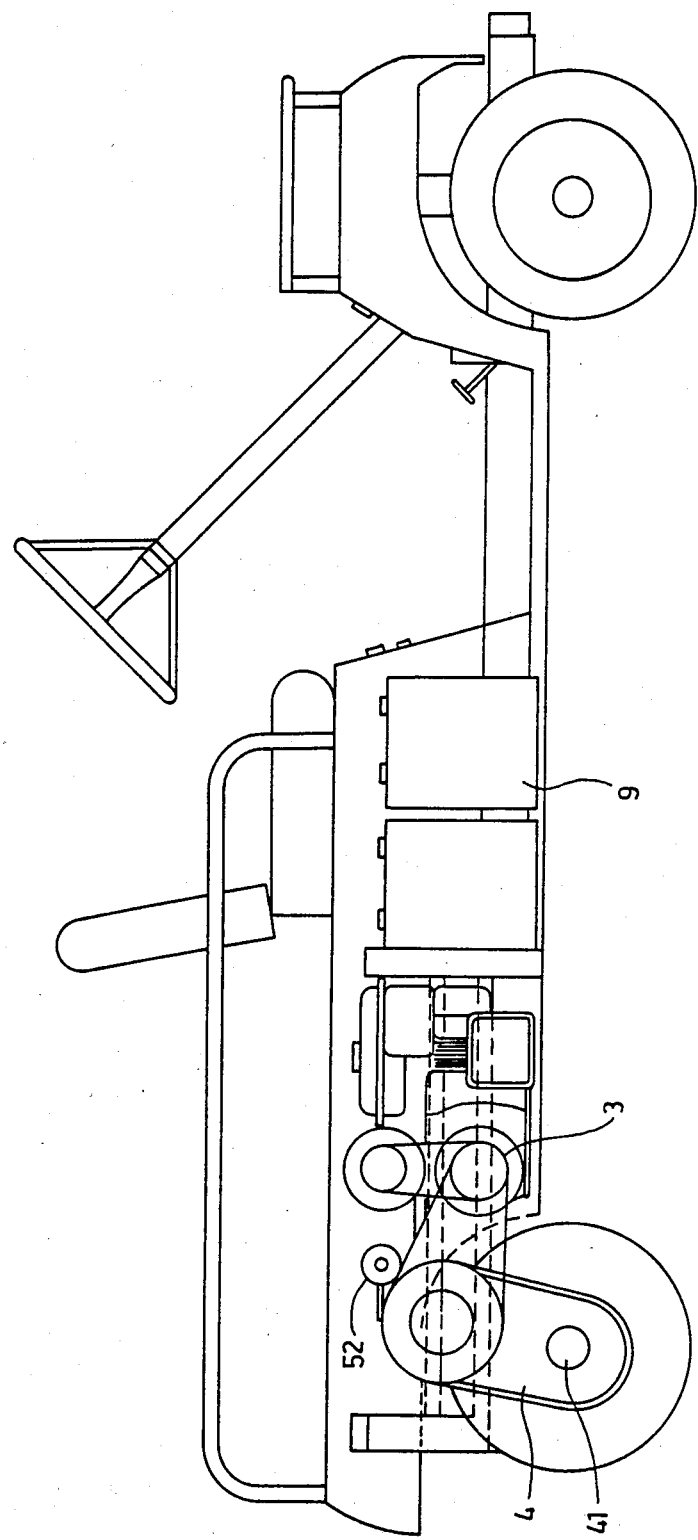
FIG. 2 is a side view of the vehicle with multiple power source of FIG. 1.
Figure 3:
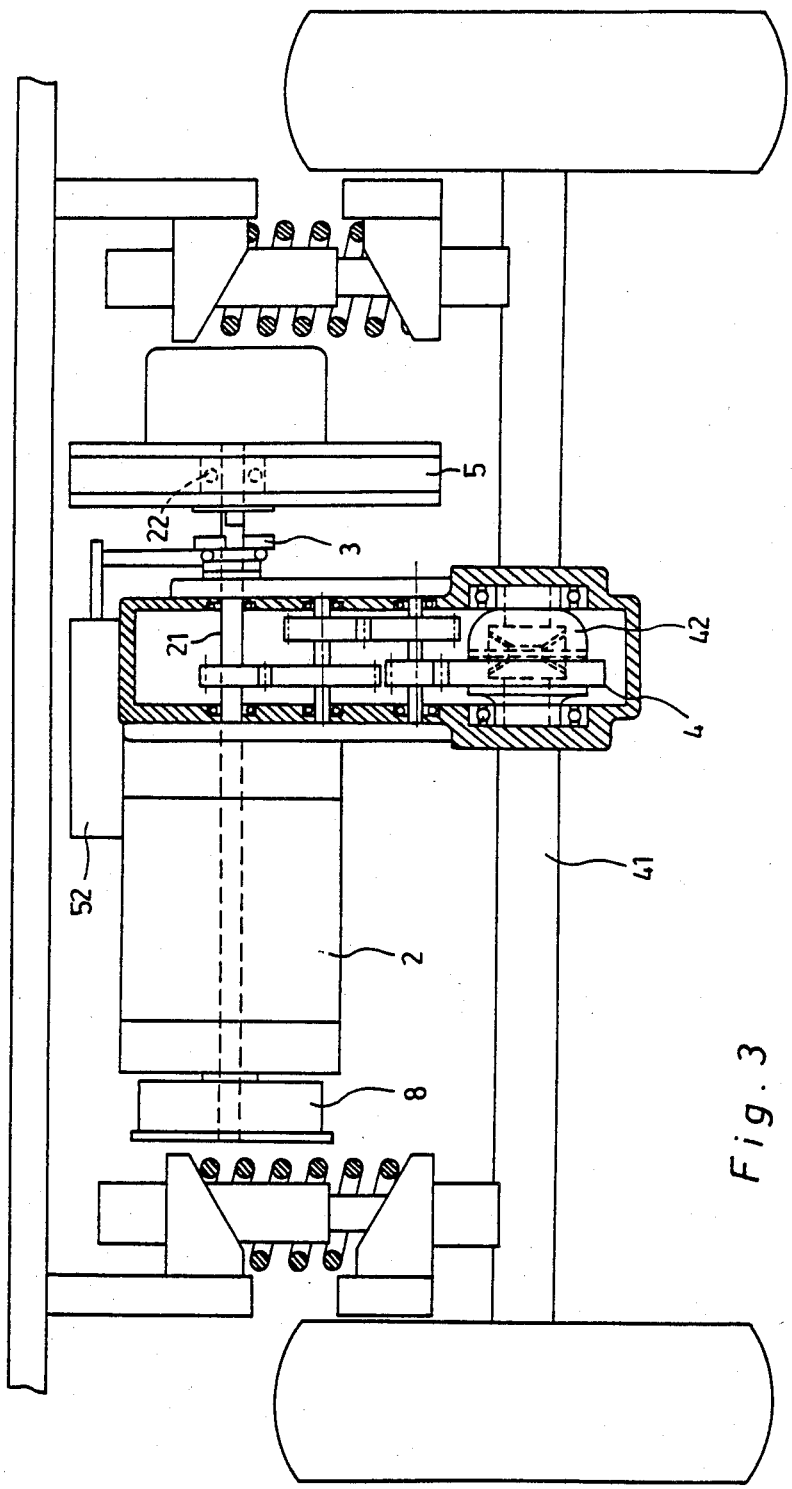
FIG. 3 is a rear view of the vehicle with multiple power source of FIG. 1.

Referring now to FIGS. 1-3, there is shown therein a vehicle with multiple power source comprising an engine 1, an electric motor 2, a torque converter 3, a transmission 4, a solenoid operated clutch 5, a circuit controller 6, a starting motor 7, a mechanical brake 8, a battery 9, and a charger 10 etc. The torque converter 3 is a prior known device, and also named as continuously variable transmission (CVT) and it is disposed between the output shaft 11 of the engine 1 and the output shaft 21 of the electric motor, and has two split pulleys 31.

Figure 4:
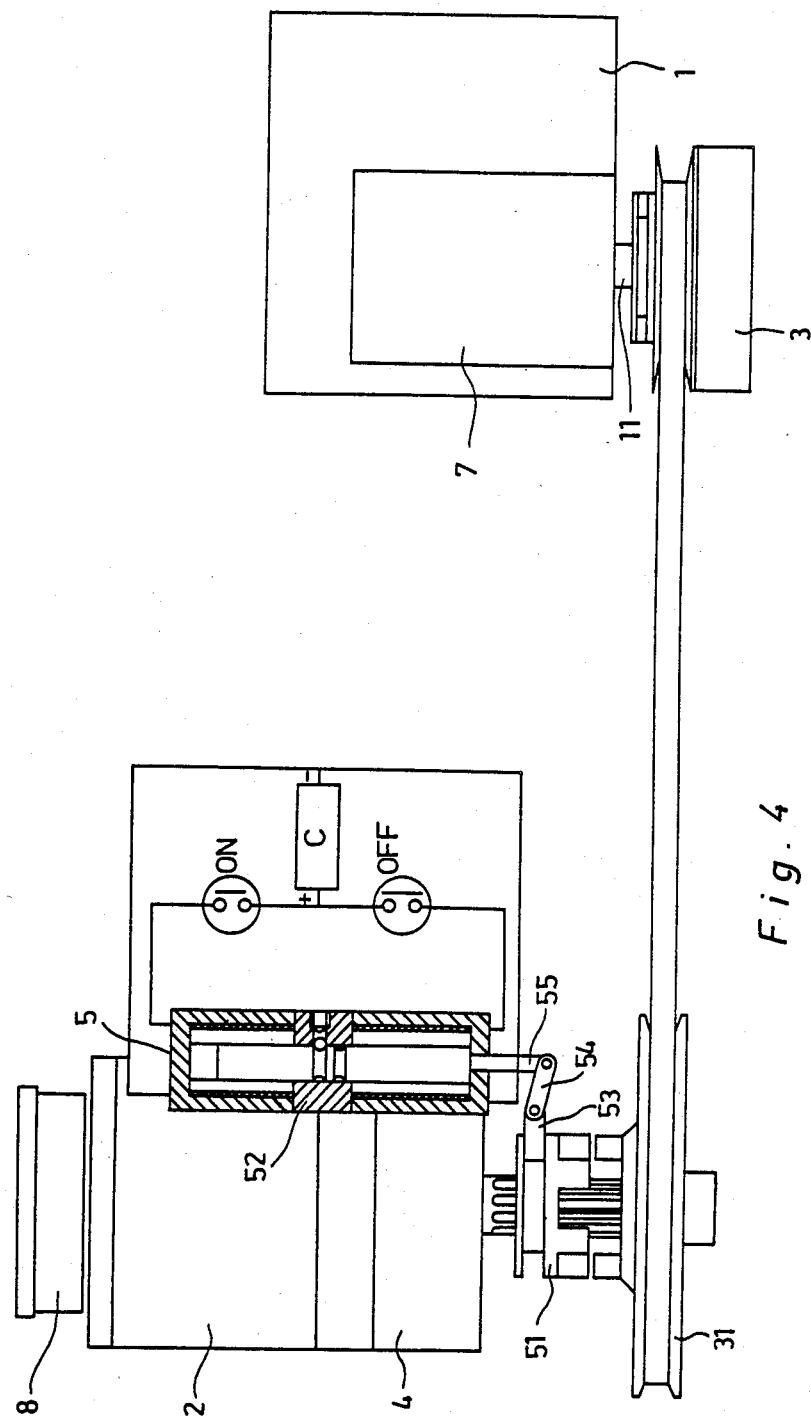
FIG. 4 is a top view showing the solenoid operated clutch in accordance with the present invention.
Figure 5:
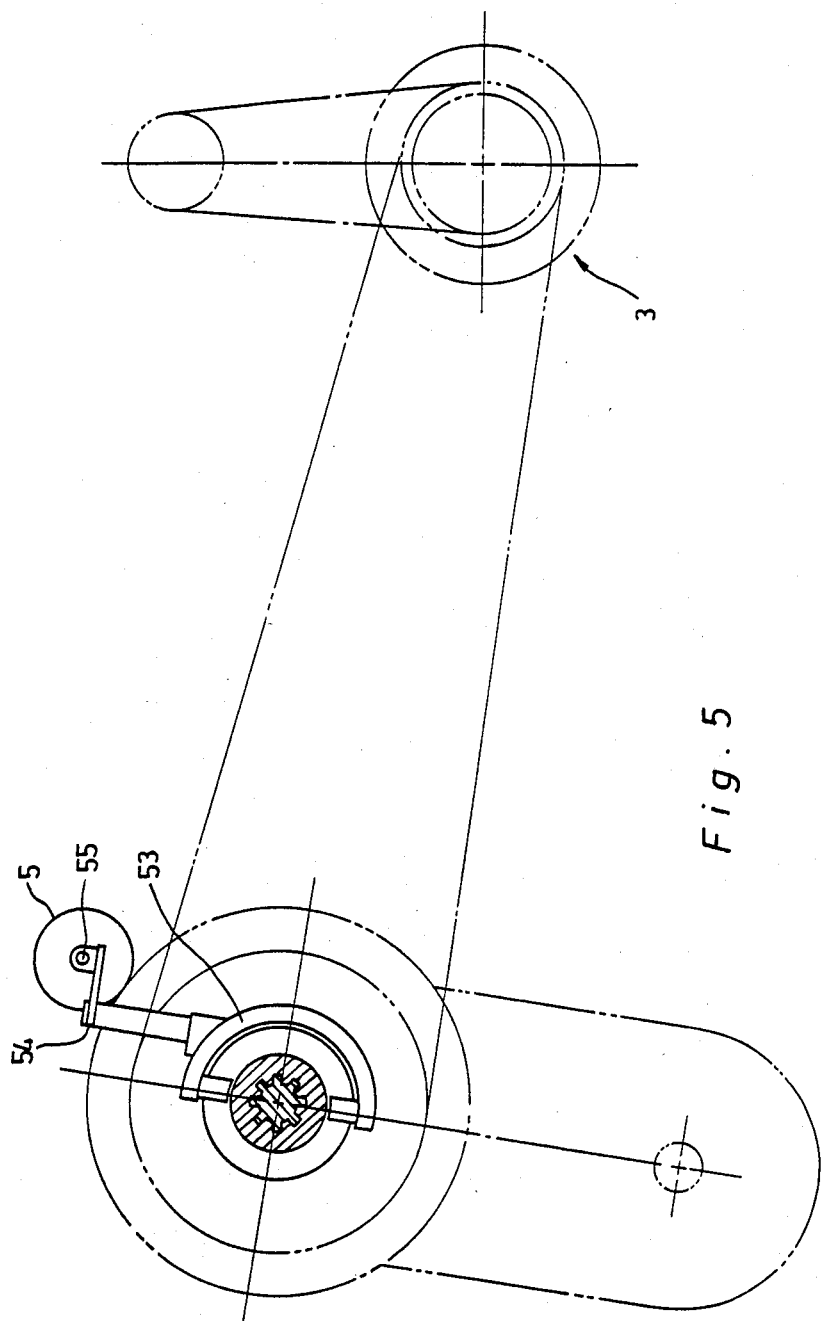
FIG. 5 is a bottom view showing the solenoid operated clutch in accordance with the present invention.

The solenoid operated clutch 5 is disposed on the output shaft 21 of the electric motor 2 adjacent to the torque converter 3. Referring to FIGS. 5 and 4, the solenoid operated clutch 5 comprises a pair of discs 51, a solenoid valve 52, a y-shaped rod 53 which is connected to the piston rod 55 of the solenoid valve 52 by means of a connecting rod 54. Engagement or disengagement of the disc of the solenoid operated clutch can be obtained by means of a ON switch and OFF switch, as well as a simple circuit, in order to control the power transmission between the output shaft 11 of the engine and the output shaft 21 of the electric motor. The gear transmission 4 is disposed on the output shaft 21 of the electric motor adjacent to the solenoid clutch 5, and has an output shaft 41 served as a wheel axle. A differential 42 is provided on the intermediate portion of the output shaft 41 of the transmission 4.

The mechanical brake 8 is provided on the input shaft of the transmission 4, and connected to a brake pedal 81 by means of a wire for effecting brake effect.

The constructional principle and operation of the circuit controller 6, starting motor 7, battery 9 and charger 10 will not be described because they are all known in the art.

The constructional principle of the torque converter is also known in the art. The torque converter does most of the efficient speed by adjusting two split pulleys in concert. For example, to shift into a higher gear, the pulley linked to the engine squeezes together, pushing the belt up to its V-shaped groove to form a bigger loop, corresponding to a larger gear. Simultaneously, the drive-shaft pulley spreads apart, dropping the belt lower in its V-groove. The engine always runs at its most efficient speed by continuously adjusting the pulleys means.

When the engine is not in operation, the output shaft 21 of the electric motor can rotate smoothly because there is a bearing 22 provided between the end of output shaft 21 of the electric motor 2 and the torque converter 3 if the clutch 5 is in the "OFF" position and the switch 14 for the electric motor is "ON". The power of the electric motor can be transmitted from the output shaft 21 to the wheel axle 41 via transmission 4 and differential 42.

If the engine is to be used, depress the "ON" switch for the clutch 5 and the engine switch 13, and the power of the engine can be transmitted from the engine to the wheel axle 41 via torque converter 3, transmission 4 and differential 42.

If both the engine and the electric motor are to be used simultaneously, depress the "ON" switch and the switch 14 for the electric motor, as well as the engine switch 13. With the above said torque converter, the engine and electric motor will run synchronously in order to increase the driving force of the vehicle.

We claim:
1. A multiple power source vehicle comprised of:
at least two power sources;

at least two output shafts, one each of said output shafts being connected to one each of said power sources;

at least one belt-driven continuously variable torque converter; and at least one solenoid clutch means, said belt-driven continuously variable torque converter being disposed between said two output shafts and said clutch means being disposed adjacent said belt-driven continuously variable torque converter for shifting power transmission between the output shaft of one of said power sources and the output shaft of the second of said power sources, said output shafts being connected parallel of one another.

2. A multiple power source vehicle according to claim 1 wherein said output shafts are transverse of a longitudinal axis of the vehicle.

3. A multiple power source vehicle according to claim 1 wherein there are two sources of power, the first being an electric motor and the second being an engine.

4. A multiple power source vehicle according to claim 3 wherein there are two output shafts, one of said output shafts being connected to said engine and the other of said output shaft being connected to said electric motor.

5. A multiple power source vehicle according to claim 4 wherein said output shaft of said electric motor may also serve as an intermediate drive shaft.

6. A multiple power source vehicle according to claim 2 wherein said clutch means is a solenoid clutch means.

7. A multiple power source vehicle according to claim 2 wherein said power sources operated concurrently.

8. A multiple power source vehicle according to claim 2 wherein said power sources operate asynchronously.

9. A multiple power source vehicle according to claim 4 wherein said power sources operate concurrently.

10. A multiple power source vehicle according to claim 4 wherein said power sources operate asynchronously.

* * * * *